July 7, 1931. A. S. MACKENZIE 1,813,750
DRIER
Filed Oct. 27, 1928
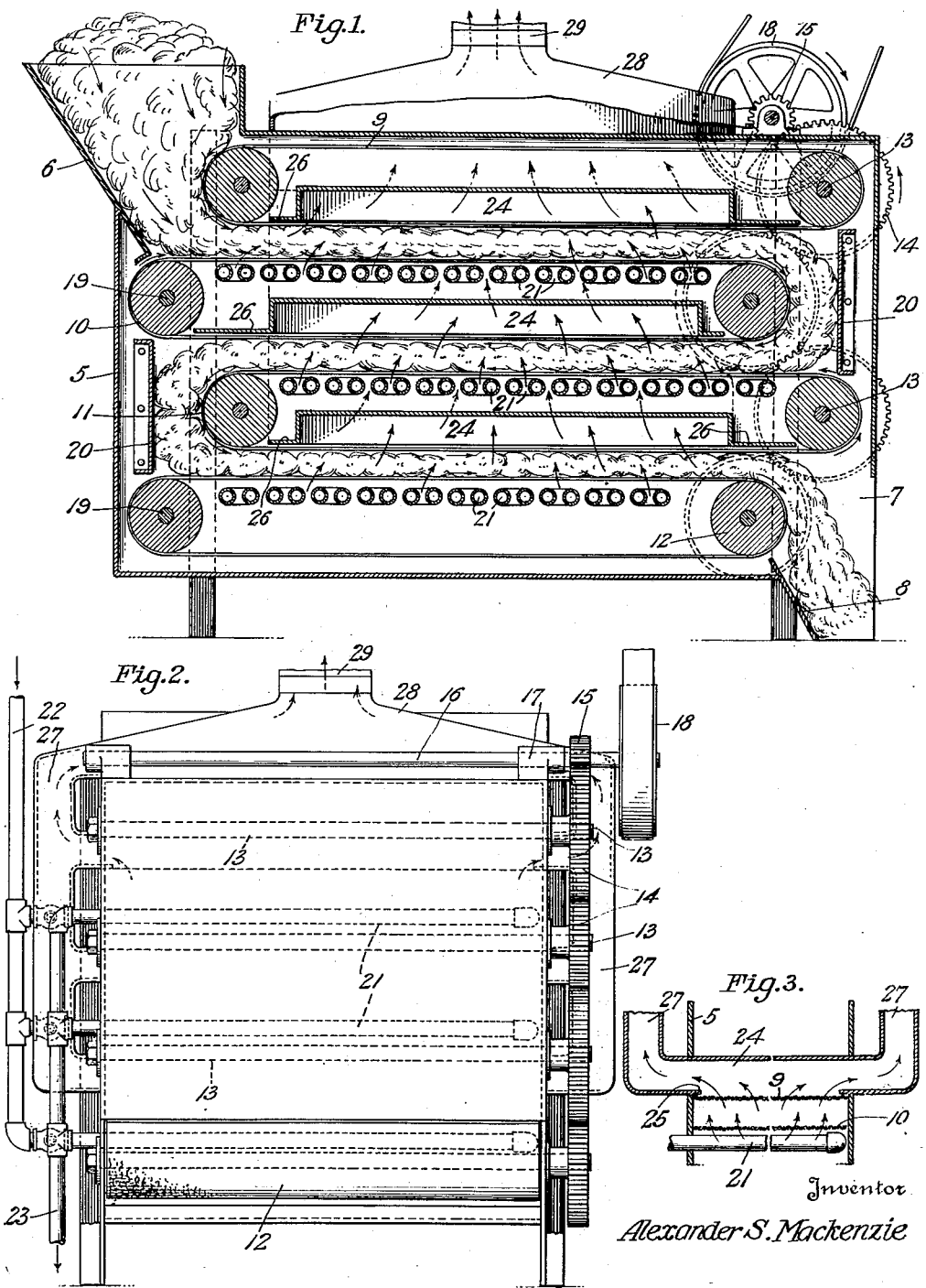
Inventor
Alexander S. Mackenzie
By Cushman Bryant & Darby
Attorneys Patented July 7, 1931

1,813,750

UNITED STATES PATENT OFFICE

ALEXANDER S. MACKENZIE, OF HOUSTON, TEXAS, ASSIGNOR TO CLAYTON GIN COMPRESS COMPANY, OF HOUSTON, TEXAS, A CORPORATION OF TEXAS

DRIER

Application filed October 27, 1928. Serial No. 315,503.

This invention relates to new and useful improvements in driers, and has for its principal object the provision of means for quickly and economically removing surplus moisture from material.

An important object of the invention is to provide a drier in which the heat from the heating medium is concentrated upon the material to be dried, and is caused to pass from the heating medium directly through the material and quickly to the exhaust means before it has an opportunity to lose any of its heat or to impart moisture to the other courses of material.

Another object of the invention is to provide the drier with a feeding hopper, and arrange the means for conveying the material through the drier so as to project into the hopper to loosen the material therein and insure its positive feed to the drier.

A still further object of the invention is to provide a novel construction for the air exhausting means, which may be inexpensively manufactured and assembled with ease, and at a minimum expense.

Other objects and advantages of the invention will become apparent during the course of the following description.

In the accompanying drawings forming a part of the description, and wherein like numerals are employed to designate like parts throughout the several views, Figure 1 is a vertical longitudinal section through the drier.

Figure 2 is an end elevation of the same, and

Figure 3 is a fragmentary, transverse section through a portion of the drier.

Referring now more particularly to the drawings, the numeral 5 designates a substantially rectangular drying chamber having at one of its upper corners, a material feeding hopper 6, which extends down into the drying chamber for a purpose which will be presently described. The diagonally opposite end of this chamber is provided with an outlet opening 7 having a material discharge chute 8 for directing the material to any suitable point. This drying chamber is otherwise closed, except for the admission of air exhausting means which will be hereinafter described.

Within the drying chamber is located a plurality of horizontally disposed and vertically spaced endless foraminous aprons 9, 10, 11 and 12, which are arranged in staggered relation with the end of one projecting beyond the ends of adjacent aprons so that material feed between the first two aprons will be discharged and turned over on its reverse side upon the succeeding apron and so on, through a series of aprons whereby the material to be dried is caused to travel in a serpentine path through the drier to be ultimately discharged by the lowermost apron 12 through the discharge opening 7. Of course, these endless aprons are driven in such directions that the adjacent runs of adjacent aprons travel at the same speed and in the same direction, while the adjacent runs of the succeeding pair of adjacent aprons move in the opposite direction. The motive power for these series of aprons is derived through a plurality of roller shafts 13, one for each of the aprons, and which are arranged transversely of the chamber 5, and journalled in bearings in opposite sides of the chamber. This series of shafts 13 are arranged in vertical staggered relation to obtain the staggering of the ends of the aprons as heretofore described. In order that all of these shafts will be driven at the same speed from a common source, a gear 14 is keyed to each of the shafts to mesh with similar gears of adjacent shafts, the uppermost gear meshing with a pinion 15 mounted upon a main drive shaft 16 journalled across the top of the drying chamber in bearings 17. This main drive shaft is provided with a pulley 18 to which power may be belted from any suitable source. With this arrangement of gearing, which is located at one side of the chamber, alternative aprons will be driven in the same direction; the upper runs of the aprons 9 and 11 moving to the left of Figure 1, while the upper runs of aprons 10 and 12 move toward the right of Figure 1.

The opposite ends of all of the endless aprons are supported by roller shafts 19, similar to those at 13, and similarly arranged in vertical, staggered relation, so that the aprons will feed the material from one to the other in succession.

Vertically disposed baffle plates 20, extending entirely across the drier chamber, are mounted between the roller shafts 13 of aprons 9 and 11, and between the roller shafts 19 between the aprons 10 and 12, so as to guide or deflect material from the aprons 10 and 11 onto the next succeeding apron. All of the endless aprons are constructed of foraminous material, through which air will readily pass, and are here shown as being constructed of woven wire mesh, although any other suitable material may be provided.

In order to remove excess moisture from material conveyed through the drying chamber, a horizontally disposed zigzag steam coil 21 is positioned between the runs of each of the three lower roller aprons, and in close proximity to the upper runs or reaches thereof. All of these steam coils are supplied with live steam through an inlet pipe 22 connected to corresponding ends of the coils at one end of the chamber, while the opposite ends of the steam coils are connected to a common outlet conduit 23.

In order to rapidly exhaust the heated air as rapidly as it becomes humidified by its passage through the material being dried, so that the humid air will not be permitted to pass through other courses of the material, air exhausting means is provided for each of the three uppermost aprons, and consists of a suction box 24 having its inlet opening arranged in close proximity to the lower run of its respective apron, and substantially coextensive in width and length therewith. The longitudinal edges 25 of these suction boxes extend inwardly of the drier chamber from opposite sides thereof as best seen in Figure 3, while the opposite ends of each suction box are provided with horizontal and longitudinally disposed flanges 26. The lower run of each of the uppermost three aprons is adapted to ride along the flanges 25 and 26 in contact therewith, and it will be noted that the flanges 26 at opposite ends of the suction boxes extend practically to the roller shafts of the conveyor with which the box is associated.

It will also be noted that the inlets of the suction boxes are arranged directly above the heating coils of the next lower-most apron, and are substantially coextensive with such heating coils, in order to be able to rapidly discharge the humidified air from the drying chamber.

Opposite sides of all of the suction boxes 24 communicate with exhaust manifolds 27 at opposite sides of the drying chamber 5 and these manifolds are connected by a manifold 28 overlying the top of the drying chamber, with an exhaust duct 29 in which suction is created by any suitable means such as a fan or the like. It will be noted that the top wall of the drying chamber 5 cooperates with the manifold 28 in forming an enclosure constituting this manifold, in consequence of which, the top wall of the drying chamber will always be heated due to the passage of heated humidified air passing through the manifold 28.

It will also be noted that the endless apron 10 projects to an extent to be disposed directly under the open bottom of the feeding hopper 6 to constitute a movable bottom, while one end of the upper endless apron 9 extends into the feeding hopper 6 to cooperate in assisting the discharge of material therefrom, and to prevent clogging of the material passing through the hopper. Material after passing through the feeding hopper 6 is caused to move to the right of Figure 1 between the adjacent runs of aprons 9 and 10, and directly above the upper heating coil 21 and directly beneath the suction box 24 arranged between the runs of the apron 9. Suction acting through the suction box rapidly draws the heated air through the course of material between the aprons 9 and 10, causing it to give up some of its moisture which humidifies the air, due to the fact that the inlet of the suction box 24 is arranged directly above the course of material, as well as the heating coil 21, and is substantially coextensive therewith. The humidified air is rapidly extracted from the drying chamber 5, so as not to retard further drying of the material.

After the material passes between the aprons 9 and 10, it is discharged from the latter apron and against the baffle 20, to be deflected and turned over on its reverse side upon the upper run of the apron 11, so as to expose the side of material next to the heating coil which, in the course above, was arranged adjacent the suction box of the upper apron 9. The material is given a second drying treatment as it passes in the course between the aprons 10 and 11, and a third drying treatment as it passes between the last two aprons 11 and 12. Since a suction box 24 is provided between the runs of the two aprons 9, 10 and 11, the moisture laden air is rapidly removed from the drying chamber and, consequently, it is not given an opportunity to pass through the other courses of the material to give up its moisture thereto. The result is that the material is much more rapidly dried and relieved of its excess moisture than with the drying arrangements heretofore known, in consequence of which, the aprons may be driven faster and the drying operation completed in less time.

Various changes in the construction and arrangement of the various parts of this device may be resorted to without departing from the spirit of the invention or the scope of the appended claims.

I claim:

1. In a drier, the combination with a plurality of endless aprons arranged to convey material through the drier and discharge it from one to the other, of an air exhausting chamber arranged between the runs of one of said aprons with its inlet opening substantially coextensive with a run of said apron and arranged in close proximity thereto, said chamber having its ends in the plane of said opening and arranged in contact with the run of said apron.

2. In a drier, the combination with a plurality of endless aprons arranged to convey material through the drier and discharge it from one to the other in succession, heating mediums arranged between the runs of all lower aprons in proximity to the upper runs thereof, air exhausting means arranged between the runs of all upper aprons in proximity to the lower runs thereof, the intermediate aprons having both heating medium and air exhausting means between their respective runs, whereby each course of material travels in immediate proximity to the treating means, and the humid air is expelled immediately upon passing through a course of the material.

3. In a drier, the combination with a plurality of endless aprons arranged to convey material through the drier and discharge it from one to the other, a heating medium substantially coextensive with one of said aprons and arranged between the runs thereof, a suction box arranged between the runs of an adjacent apron and having an inlet opening substantially coextensive with said heating medium, said suction box having flanges surrounding its inlet opening and adapted to contact with a run of said apron.

In testimony whereof I have hereunto set my hand.

ALEXANDER S. MACKENZIE.